United States Patent
Kim et al.

(10) Patent No.: US 10,798,658 B2
(45) Date of Patent: Oct. 6, 2020

(54) METHOD AND APPARATUS FOR SETTING UPLINK TRANSMITTING POWER IN WIRELESS COMMUNICATION SYSTEM

(71) Applicant: Samsung Electronics Co., Ltd., Gyeonggi-do (KR)

(72) Inventors: Youngbum Kim, Seoul (KR); Taehyoung Kim, Seoul (KR); Seunghoon Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/610,388

(22) PCT Filed: May 8, 2018

(86) PCT No.: PCT/KR2018/005280
§ 371 (c)(1),
(2) Date: Nov. 1, 2019

(87) PCT Pub. No.: WO2018/208065
PCT Pub. Date: Nov. 15, 2018

(65) Prior Publication Data
US 2020/0059869 A1 Feb. 20, 2020

(30) Foreign Application Priority Data
May 8, 2017 (KR) .................. 10-2017-0057598

(51) Int. Cl.
*H04W 52/14* (2009.01)
*H04W 52/36* (2009.01)
(Continued)

(52) U.S. Cl.
CPC ......... *H04W 52/146* (2013.01); *H04W 52/36* (2013.01); *H04W 52/42* (2013.01); *H04W 52/48* (2013.01); *H04W 52/50* (2013.01)

(58) Field of Classification Search
CPC ... H04W 52/146; H04W 52/36; H04W 52/42; H04W 52/48; H04W 52/50
See application file for complete search history.

(56) References Cited

U.S. PATENT DOCUMENTS

2009/0175161 A1 7/2009 Yi et al.
2010/0041428 A1* 2/2010 Chen ............... H04W 52/16
455/522

(Continued)

FOREIGN PATENT DOCUMENTS

KR  1020140111655  9/2014
KR  101654408  9/2016

(Continued)

OTHER PUBLICATIONS

PCT/ISA/210 Search Report issued on PCT/KR2018/005280, pp. 5.
(Continued)

*Primary Examiner* — Dominic E Rego
(74) *Attorney, Agent, or Firm* — The Farrell Law Firm, P.C.

(57) ABSTRACT

The present disclosure relates to a communication scheme for convergence of an IoT technology and a 5G communication system for supporting a higher data transmission rate beyond a 4G system, and a system therefor. The present disclosure may be applied to an intelligent service (for example, a smart phone, a smart building, a smart city, a smart car or connected car, healthcare, digital education, retail business, a security and security related service, or the like) on the basis of a 5G communication technology and an IoT related technology. The present invention proposes a method and an apparatus for minimizing an uplink interference and avoiding unnecessary transmission power consumption of a terminal, by defining a method for setting uplink transmission power of the terminal in a mobile communication system. According to the present invention, (Continued)

a method for a terminal in a wireless communication system comprises the steps of: transmitting a random access preamble; receiving a random access response including a power control command; determining transmission power of uplink data on the basis of whether a beam through which the random access preamble has been transmitted is changed; and transmitting the uplink data on the basis of the transmission power.

16 Claims, 16 Drawing Sheets

(51) Int. Cl.
*H04W 52/42* (2009.01)
*H04W 52/48* (2009.01)
*H04W 52/50* (2009.01)

(56) References Cited

U.S. PATENT DOCUMENTS

| | | | | |
|---|---|---|---|---|
| 2011/0188427 A1* | 8/2011 | Ishii | ............... | H04W 52/367 370/311 |
| 2011/0281612 A1* | 11/2011 | Ishii | ............... | H04W 52/32 455/522 |
| 2012/0282970 A1* | 11/2012 | Kela | ............... | H04W 52/248 455/522 |
| 2013/0058315 A1* | 3/2013 | Feuersanger | ....... | H04W 52/346 370/336 |
| 2013/0064199 A1 | 3/2013 | Kim et al. | | |
| 2013/0083739 A1 | 4/2013 | Yamada | | |
| 2014/0056251 A1 | 2/2014 | Ahn et al. | | |
| 2014/0086193 A1* | 3/2014 | Suzuki | ............... | H04W 52/18 370/329 |
| 2015/0223181 A1* | 8/2015 | Noh | ............... | H04L 25/0226 370/329 |
| 2015/0296525 A1* | 10/2015 | Kim | ............... | H04W 16/10 370/329 |
| 2015/0305066 A1* | 10/2015 | Jeong | ............... | H04W 52/242 370/225 |
| 2015/0333879 A1 | 11/2015 | Yang et al. | | |
| 2016/0087877 A1 | 3/2016 | Ryu et al. | | |
| 2016/0337991 A1* | 11/2016 | Zhang | ............... | H04W 4/70 |
| 2018/0235013 A1* | 8/2018 | Jung | ............... | H04W 74/006 |
| 2018/0242367 A1 | 8/2018 | Kim et al. | | |
| 2018/0324716 A1* | 11/2018 | Jeon | ............... | H04W 74/0833 |
| 2018/0324853 A1* | 11/2018 | Jeon | ............... | H04W 74/08 |

FOREIGN PATENT DOCUMENTS

| | | |
|---|---|---|
| WO | WO 2007/120019 | 10/2007 |
| WO | WO 2011118944 | 9/2011 |
| WO | WO 2017030412 | 2/2017 |

OTHER PUBLICATIONS

PCT/ISA/237 Written Opinion issued on PCT/KR2018/005280, pp. 5.
Nokia, Alcatel-Lucent Shanghai Bell, "NR 4-step RACH Procedure", R1-1708244, 3GPP TSG-RAN WG1#89, May 15-19, 2017, 12 pages.
Huawei, HiSilicon, "Power Ramping for RACH", R2-1705191, 3GPP TSG RAN WG2 Meeting #98, May 15-19, 2017, 3 pages.
Mitsubishi Electric, "On RACH Retransmission", R1-1704485, 3GPP TSG-RAN WG1 #88bis, Apr. 3-7, 2017, 8 pages.
LG Electronics, "Discussion on RACH Procedure", R1-1707594, 3GPP TSG RAN WG1 Meeting #89, May 15-19, 2017, 11 pages.
Samsung, "Power Ramping for 4 Step RACH Procedure", R1-1707940, 3GPP TSG RAN WG1 Meeting #89, May 15-19, 2017, 3 pages.
Intel Corporation, "Details on NR PRACH Procedures", R1-1707343, 3GPP TSG RAN WG1 #89, May 15-19, 2017, 9 pages.
European Search Report dated Mar. 2, 2020 issued in counterpart application No. 18799356.3-1205, 10 pages.

* cited by examiner

METHOD AND APPARATUS FOR SETTING UPLINK TRANSMITTING POWER IN WIRELESS COMMUNICATION SYSTEM

PRIORITY

This application is a National Phase Entry of PCT International Application No. PCT/KR2018/005280 which was filed on May 8, 2018, and claims priority to Korean Patent Application No. 10-2017-0057598, which was filed on May 8, 2017, the content of each of which is incorporated herein by reference.

TECHNICAL FIELD

The disclosure relates to a cellular wireless communication system and, more particularly, to a method of setting the uplink transmission power of a terminal.

BACKGROUND ART

To meet the demand for wireless data traffic, which has increased since the commercialization of 4G communication systems, efforts have been made to develop an improved 5G communication system or a pre-5G communication system. Therefore, the 5G communication system or the pre-5G communication system is called a "beyond-4G-network communication system" or a "post-LTE system". Consideration is being given to implementation of the 5G communication system in super-high-frequency (mmWave) bands (e.g., a band of 60 GHz) so as to accomplish higher data rates. In order to reduce pathloss of radio waves and in order to increase the transmission distance of radio waves in super-high-frequency bands, techniques, such as beamforming, massive multiple-input multiple-output (MIMO), full-dimensional MIMO (FD-MIMO), array antennas, analog beamforming, and large-scale antennas, are being discussed in 5G communication systems. In addition, development is under-way for system network improvement in 5G communication systems based on evolved small cells, advanced small cells, cloud radio access networks (cloud RANs), ultra-dense networks, device-to-device (D2D) communication, wireless backhaul, moving networks, cooperative communication, coordinated multi-point (CoMP), reception-end interference cancellation, and the like. Furthermore, in the 5G system, hybrid FSK and QAM modulation (FQAM) and sliding window superposition coding (SWSC), as advanced coding modulation (ACM), and filter bank multi-carrier (FBMC), non-orthogonal multiple access (NOMA), and sparse code multiple access (SCMA), as advanced access technologies, are being developed.

Meanwhile, the Internet, which to date has been a human-centered connectivity network where humans generate and consume information, is now evolving to the Internet of Things (IoT), where distributed entities, or "things", exchange and process information. The Internet of Everything (IoE), which is a combination of IoT technology and big-data processing technology through connection with a cloud server, has emerged. As technology elements, such as sensing technology, wired/wireless communication and network infrastructure, service interface technology, and security technology, have been demanded for IoT implementation, techniques for connecting things, such as a sensor network, machine-to-machine (M2M) communication, machine-type communication (MTC), and the like, have been recently researched. An IoT environment may provide intelligent Internet technology (IT) services that create new value in people's lives by collecting and analyzing data generated from connected things. The IoT may be applied to a variety of fields, such as smart homes, smart buildings, smart cities, smart cars or connected cars, smart grids, healthcare, smart appliances, and advanced medical services, through convergence and combination between existing information technology (IT) and various industries.

In line with this, various attempts have been made to apply 5G communication systems to IoT networks. For example, technologies such as a sensor network, machine-to-machine (M2M) communication, machine-type communication (MTC), and the like, are being implemented by 5G communication techniques, such as beamforming, MIMO, array antennas, and the like. The application of a cloud radio access network (RAN) as the above-described big-data processing technology may also be considered as an example of convergence between the 5G technology and the IoT technology.

Meanwhile, uplink interference may be minimized, and unnecessary power consumption of a terminal for transmission may be reduced by appropriately setting the uplink transmission power of a terminal in a mobile communication system.

DETAILED DESCRIPTION OF THE INVENTION

Technical Problem

The disclosure proposes a method of efficiently setting the transmission power of a terminal in a mobile communication system.

Solution to Problem

In order to solve the above problems, a method of a terminal in a wireless communication system according to the disclosure may include: transmitting a random access preamble; receiving a random access response including a power control command; determining transmission power of uplink data based on whether or not the beam that transmitted the random access preamble is changed; and transmitting the uplink data based on the transmission power.

In addition, in order to solve the above problems, a method of a base station in a wireless communication system according to the disclosure may include: receiving a random access preamble; transmitting a random access response including a power control command; and receiving uplink data based on transmission power of uplink data determined based on whether or not a beam that transmitted the random access preamble is changed.

In addition, in order to solve the above problems, a terminal in a wireless communication system according to the disclosure may include: a transceiver; and a controller configured to transmit a random access preamble, receive a random access response including a power control command, determine transmission power of uplink data based on whether or not a beam that transmitted the random access preamble is changed, and transmit the uplink data based on the transmission power.

In addition, in order to solve the above problems, a base station in a wireless communication system according to the disclosure may include: a transceiver; and a controller configured to receive a random access preamble, transmit a random access response including a power control command, and receive uplink data based on transmission power of uplink data determined based on whether or not a beam that transmitted the random access preamble is changed.

Advantageous Effects of Invention

According to an embodiment of the disclosure, it is possible to minimize uplink interference and to reduce unnecessary transmission power consumption by a terminal by defining a method of setting the uplink transmission power of a terminal in a mobile communication system.

MODE FOR CARRYING OUT THE INVENTION

Figure 1:
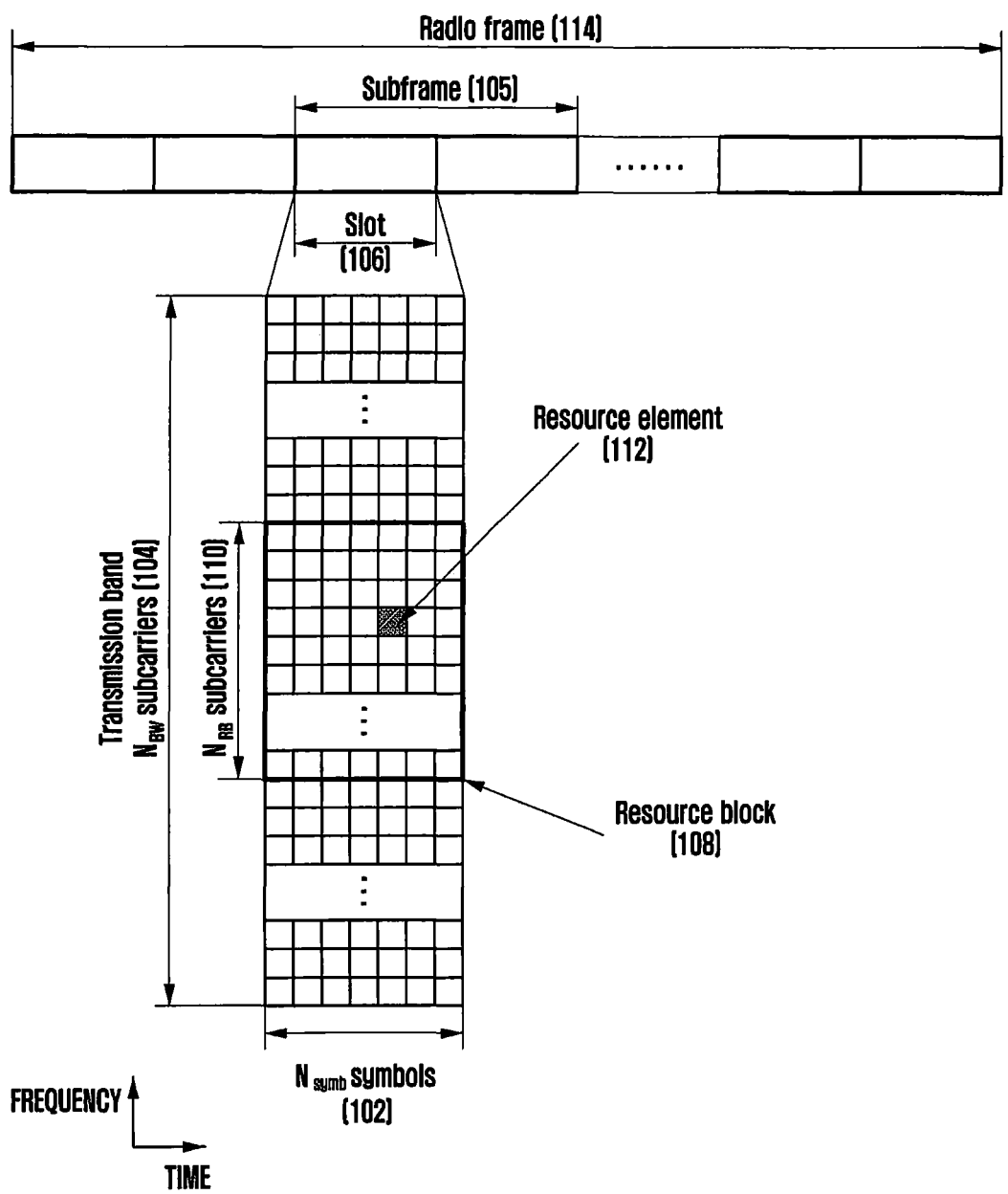
FIG. 1 is a diagram illustrating the fundamental structure of a time-frequency resource domain as a wireless resource domain in which data or a control channel of an LTE or LTE-A system is transmitted.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

In the following description, a base station is a subject which allocates resources to a terminal, and may be at least one of a Node B, a base station (BS), an eNode B (eNB), a gNode B (gNB), a wireless access unit, a BS controller, or a node on a network. The terminal may include a user equipment (UE), a mobile station (MS), a cellular phone, a smart phone, a computer, and a multimedia system capable of performing a communication function. Further, embodiments of the disclosure as described below may be applied to other communication systems having similar technical backgrounds and channel types to the embodiments of the disclosure. Further, the embodiments of the disclosure may be applied to other communication systems through modifications determined and made by those skilled in the art without significantly departing from the scope of the disclosure.

In order to process the explosively increasing amount of mobile data traffic, a 5th generation (5G) system or new radio access technology (NR), which is a next-generation communication system subsequent to long-term evolution (LTE) or evolved universal terrestrial radio access (E-UTRA) and LTE-advanced (LTE-A) or E-UTRA evolution, is under active discussion. Existing mobile communication systems have focused on general voice/data communication, whereas the 5G system aims at providing various kinds of services, such as an enhanced mobile broadband (eMBB) service for improving existing voice/data communications, an ultra-reliable and low-latency communication (URLLC) service, a massive machine-type communication (MTC) service supporting massive IoT communications, and the like, and satisfying the requirements thereof.

While the system transmission bandwidth for a single carrier is limited to a maximum of 20 MHz in existing LTE and LTE-A, the 5G system primarily aims at providing super-high-speed data services up to several Gbps by utilizing even wider bandwidths. Accordingly, under consideration for implementation in the 5G system as a candidate frequency is a super-high-frequency band from several GHz up to 100 GHz, which makes it relatively easy to secure ultra-wide-bandwidth frequencies. In addition, under consideration for implementation in the 5G system is a wide-bandwidth frequency for the 5G system obtained through reallocation or assignment of frequencies, among frequency bands of several hundreds of MHz to several GHz used in existing mobile communication systems.

The radio wave in the super-high-frequency band is sometimes referred to as a "millimeter wave (mmWave)" having a wavelength of several millimeters. However, the pathloss of radio waves increases in proportion to the frequency, band in the super-high-frequency band, so that the coverage of the mobile communication system becomes small.

In order to overcome the shortcomings due to the reduction in the coverage of the super-high-frequency band, a beamforming technique for concentrating the radiation energy of radio waves to a predetermined destination point using a plurality of antennas to increase the propagation distance of the radio wave has been emphasized. That is, the beam width of the signal to which the beamforming technique is applied becomes relatively narrow, and the radiation energy is concentrated within the narrowed beam width, so that the propagation distance of the radio wave is increased. The beamforming technique may be applied to a transmitting end and a receiving end, respectively. In addition to the effect of increasing coverage, the beamforming technique has the effect of reducing interference in areas out of the beamforming direction. In order to operate the beamforming properly, accurate measurement and feedback of transmission/reception beams is required. The beamforming technique may be applied to a one-to-one control channel or data channel between a predetermined terminal and a base station. In addition, the beamforming technique may be applied to a control channel and a data channel for transmitting a common signal transmitted from a base station to a plurality of terminals in the system, such as a synchronization signal, a physical broadcast channel (PBCH), system information, and the like, in order to increase coverage. In the case where the beamforming technique is applied to a common signal, a beam sweeping technique for changing a beam direction and transmitting a signal may be further applied so as to allow a common signal to reach a terminal located at an arbitrary position in the cell.

Another requirement for the 5G system is an ultra-low-latency service in which a transmission delay between the transmitting end and the receiving end is about 1 ms. As one way to reduce a transmission delay, the design of a frame structure based on a short transmission time interval (TTI), compared to LTE and LTE-A, is required.

The TTI is a basic time unit for performing scheduling, and the TTI of existing LTE and LTE-A systems is 1 ms corresponding to the length of one subframe. For example, short TTIs of 0.5 ms, 0.2 ms, 0.1 ms, and the like, which are shorter than those of the existing LTE and LTE-A systems, may be provided in order to meet the requirements for ultra-low latency services of the 5G system. Hereinafter, the frame structure of the LTE and LTE-A systems will be described with reference to the drawings, and the design direction of the 5G system will be described.

FIG. 1 is a diagram illustrating the fundamental structure of a time-frequency resource domain as a wireless resource domain in which data or a control channel of an LTE or LTE-A system is transmitted.

In FIG. 1, the horizontal axis represents a time domain, and the vertical axis represents a frequency domain. An uplink (UL) may be a radio link through which the terminal transmits data or control signals to the base station, and a downlink (DL) may be a radio link through which the base station transmits data or control signals to the terminal. The minimum transmission unit in the time domain of the existing LTE, LTE-A, and 5G systems is an orthogonal frequency division multiplexing (OFDM) symbol in the downlink and a single carrier-frequency division multiple access (SC-FDMA) symbol in the uplink. $N_{symb}$ symbols 102 constitute one slot 106, and two slots constitute one subframe 105. The length of the slot is 0.5 ms, and the length of the subframe is 1.0 ms. In addition, a radio frame 114 is a time-domain unit including 10 subframes. The minimum transmission unit in the frequency domain is a subcarrier of 15 kHz (subcarrier spacing=15 kHz), and the bandwidth of the total system transmission band includes a total of $N_{BW}$ subcarriers 104.

The basic resource unit in the time-frequency domain is a resource element (RE) 1120, which may be indicated by an OFDM symbol index or an SC-FDMA symbol index and a subcarrier index. A resource block (RB) {or physical resource block (PRB)} 108 is defined by consecutive $N_{symb}$ OFDM symbols or SC-FDMA symbols in the time domain and consecutive $N_{RB}$ subcarriers 110 in the frequency domain. Thus, one RB 108 includes $N_{symb} \times N_{RB}$ REs 112. In the LTE and LTE-A systems, data mapping is performed in units of an RB, and the base station performs scheduling for a predetermined terminal by a pair of RBs constituting one subframe. The number of SC-FDMA symbols or the number of OFDM symbols ($N_{symb}$) is determined by the length of a cyclic prefix (CP) that is added to each symbol to prevent interference between symbols. For example, if a normal CP is applied, $N_{symb}=7$, and if a scalable CP is applied, $N_{symb}=6$. The scalable CP may be applied to a system in which the propagation distance of a radio wave is relatively greater than that of the normal CP, thereby maintaining orthogonality between the symbols.

The subcarrier spacing, the length of the CP, and the like are information essential for OFDM transmission and reception, and the base station and the terminal need to recognize the values thereof in common for effective transmission and reception.

$N_{BW}$ and $N_{RB}$ are proportional to the system transmission bandwidth. The data rate increases in proportion to the number of RBs scheduled for the terminal.

Since the frame structure of the LTE and LTE-A systems is designed in consideration of general voice/data communication, scalability thereof is limitedly able to satisfy various services and requirements of the 5G system. Therefore, it is necessary to flexibly define and operate the frame structure in consideration of various services and requirements in the 5G system.

Figure 2:
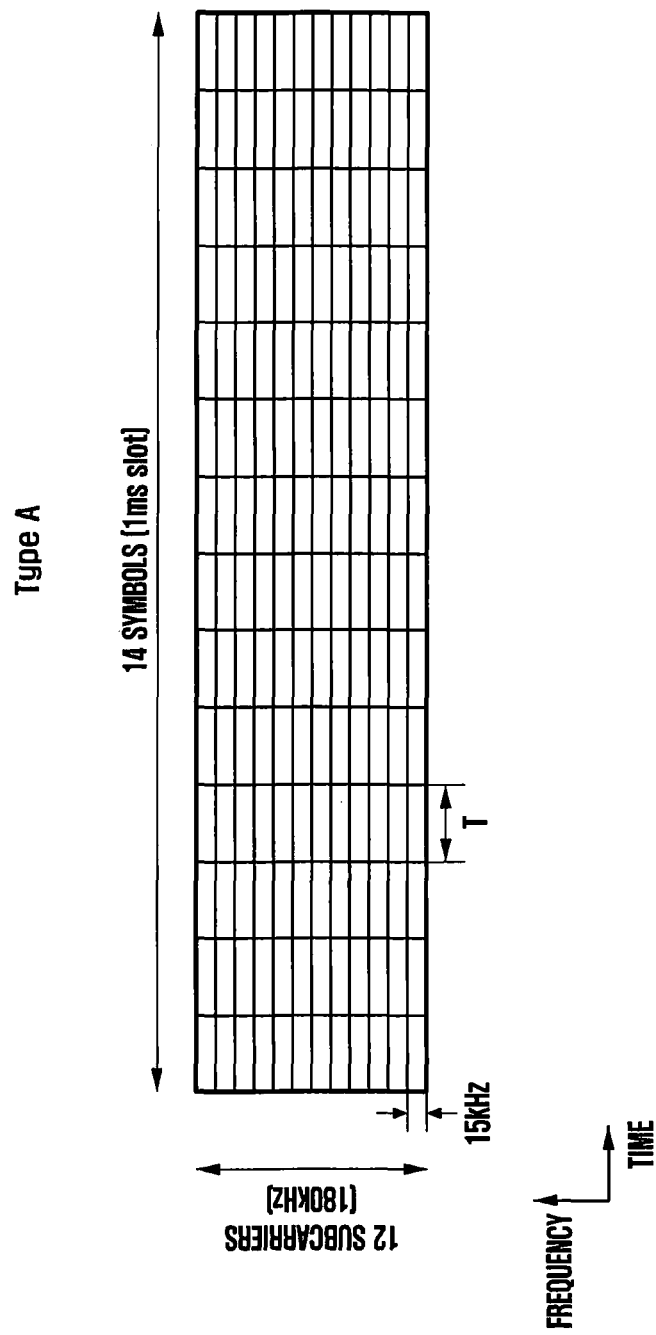
FIG. 2 is a diagram illustrating an example of a scalable frame structure of a 5G system.
Figure 3:
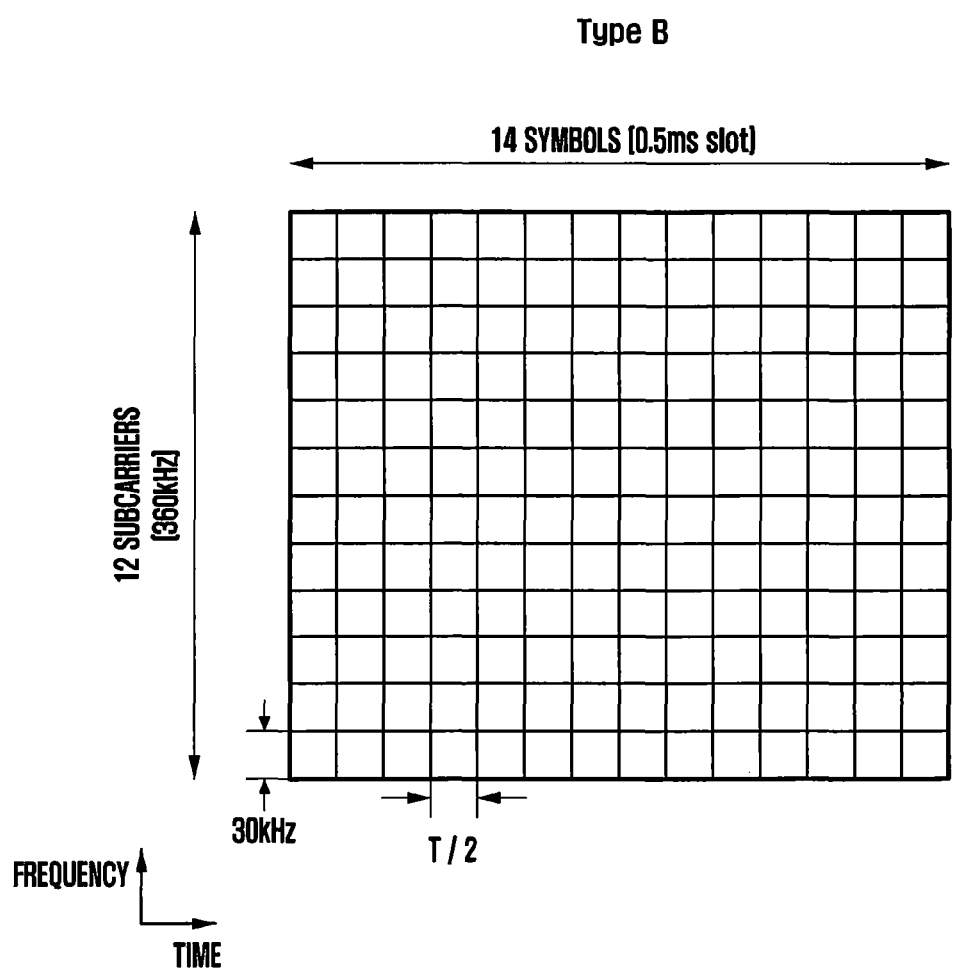
FIG. 3 is a diagram illustrating another example of a scalable frame structure of a 5G system.
Figure 4:
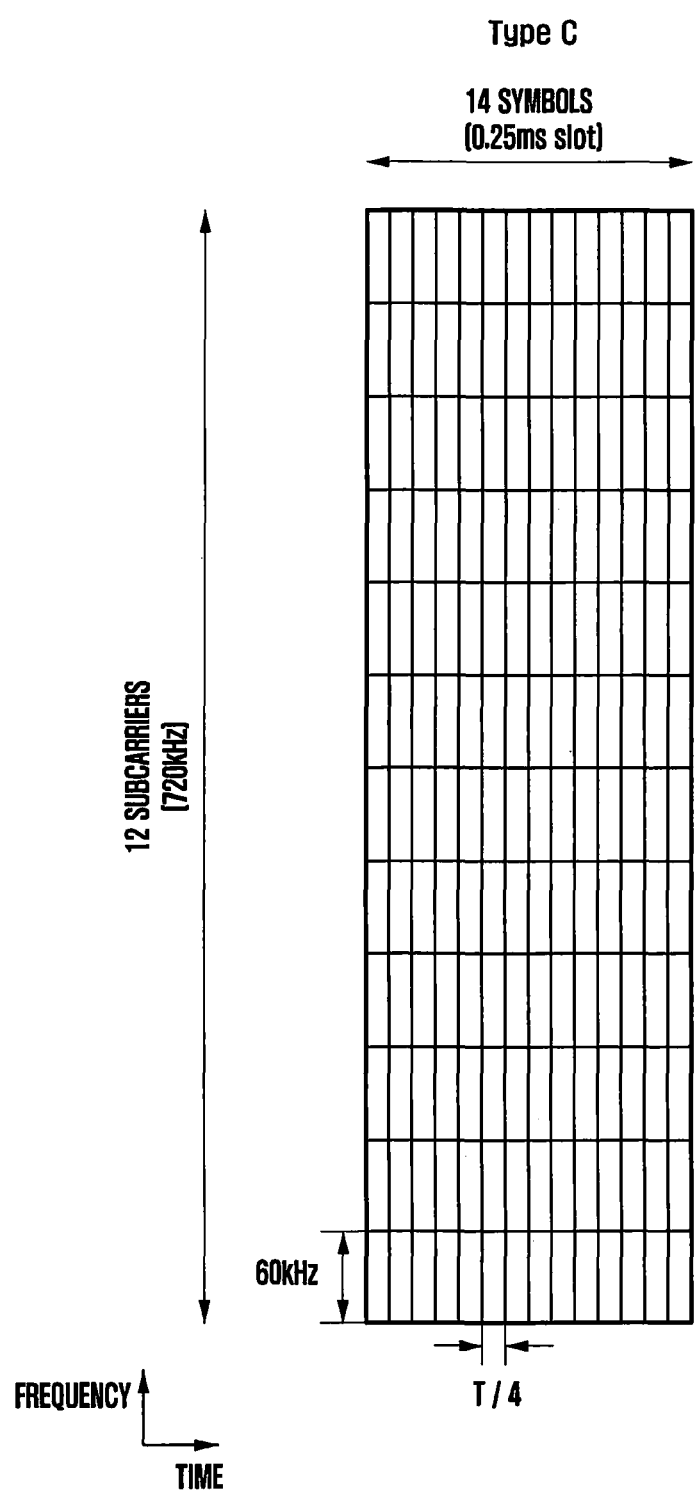
FIG. 4 is a diagram illustrating another example of a scalable frame structure of a 5G system.

FIGS. 2, 3, and 4 illustrate examples of a scalable frame structure. The examples shown in FIGS. 2, 3, and 4 show a set of essential parameters defining a scalable frame structure, which include subcarrier spacing, the length of a CP, the length of a slot, and the like. The basic time unit for performing the scheduling may be called a "slot" in the 5G system.

It is expected that the 5G system will coexist with the existing LTE/LTE-A system or will be operated in a dual mode therewith at least in the early days of introduction of the 5G system in the future. This may allow the existing LTE/LTE-A system to provide stable system operation, and may allow the 5G systems to provide enhanced services. Therefore, the scalable frame structure of the 5G system needs to include at least a frame structure or a set of essential parameters of the LTE/LTE-A system.

FIG. 2 is a diagram illustrating an example of a scalable frame structure of a 5G system.

A 5G frame structure, which is the same as the frame structure of the LTE/LTE-A system, or a set of essential parameters is shown in FIG. 2. Referring to FIG. 2, the frame structure type A is configured such that the subcarrier spacing is 15 kHz, 14 symbols constitute a slot of 1 ms, and 12 subcarriers (=180 kHz=12*15 kHz) constitute a PRB.

FIG. 3 is a diagram illustrating another example of a scalable frame structure of a 5G system.

FIG. 3 shows the frame structure type B in which the subcarrier spacing is 30 kHz, 14 symbols constitute a slot of 0.5 ms, and 12 subcarriers (=360 kHz=12*30 kHz) constitute a PRB. That is, the subcarrier spacing and the size of the PRB in the frame structure type B are double the subcarrier spacing and the size of the PRB in the frame structure type A, and the slot length and the symbol length in the frame structure type B are half the slot length and the symbol length in the frame structure type A.

FIG. 4 is a diagram illustrating another example of a scalable frame structure of a 5G system.

FIG. 4 shows the frame structure type C in which the subcarrier spacing is 60 kHz, 14 symbols constitute a subframe of 0.25 ms, and 12 subcarriers (=720 kHz=12*60 kHz) constitute a PRB. That is, the subcarrier spacing and the size of the PRB in the frame structure type C are four times greater than those in the frame structure type A, and the slot length and the symbol length in the frame structure type C are four times smaller than those in the frame structure type A.

That is, generalizing the frame structure type, the essential parameter sets, such as subcarrier spacing, the CP length, the slot length, and the like, have integer multiples between the types of frame structures, thereby providing high scalability. In addition, a subframe having a fixed length of 1 ms may be defined to indicate a reference time unit irrelevant to the frame structure type. Accordingly, one subframe includes one slot in the frame structure type A, one subframe includes two slots in the frame structure type B, and one subframe includes four slots in the frame structure type C.

The frame structure types described above may be applied to various kinds of scenarios. In terms of the cell size, as the CP length increases, a large cell may be supported. Thus, the frame structure type A may support a relatively large cell, compared to the frame structure type B or C. In terms of the operation frequency band, since large subcarrier spacing is advantageous for the phase noise recovery in the high-frequency band, the frame structure type C may support a relatively high operation frequency, compared to the frame structure type A or B. In terms of services, since a short slot length, which is a basic unit of scheduling, is advantageous for supporting ultra-low-latency services, such as URLLC, the frame structure type C is relatively suitable for a URLLC service, compared to the frame structure type A or B.

In addition, a plurality of frame structure types may be multiplexed into a single system for integrated operation.

Meanwhile, in an initial access step in which the terminal first accesses a system, the terminal performs downlink time and frequency domain synchronization using a synchronization signal and obtains a cell ID therefrom through a cell search. Then, the terminal receives system information from the base station, thereby obtaining basic parameter values related to transmission and reception, such as system bandwidth or related control information. The synchronization signal is a reference signal for a cell search, and subcarrier spacing suitable for a channel environment, such as phase noise, is applied to each frequency band. In the case of a data channel or a control channel, the subcarrier spacing may be applied differently depending on the type of service in order to support various kinds of services as described above.

Figure 5:
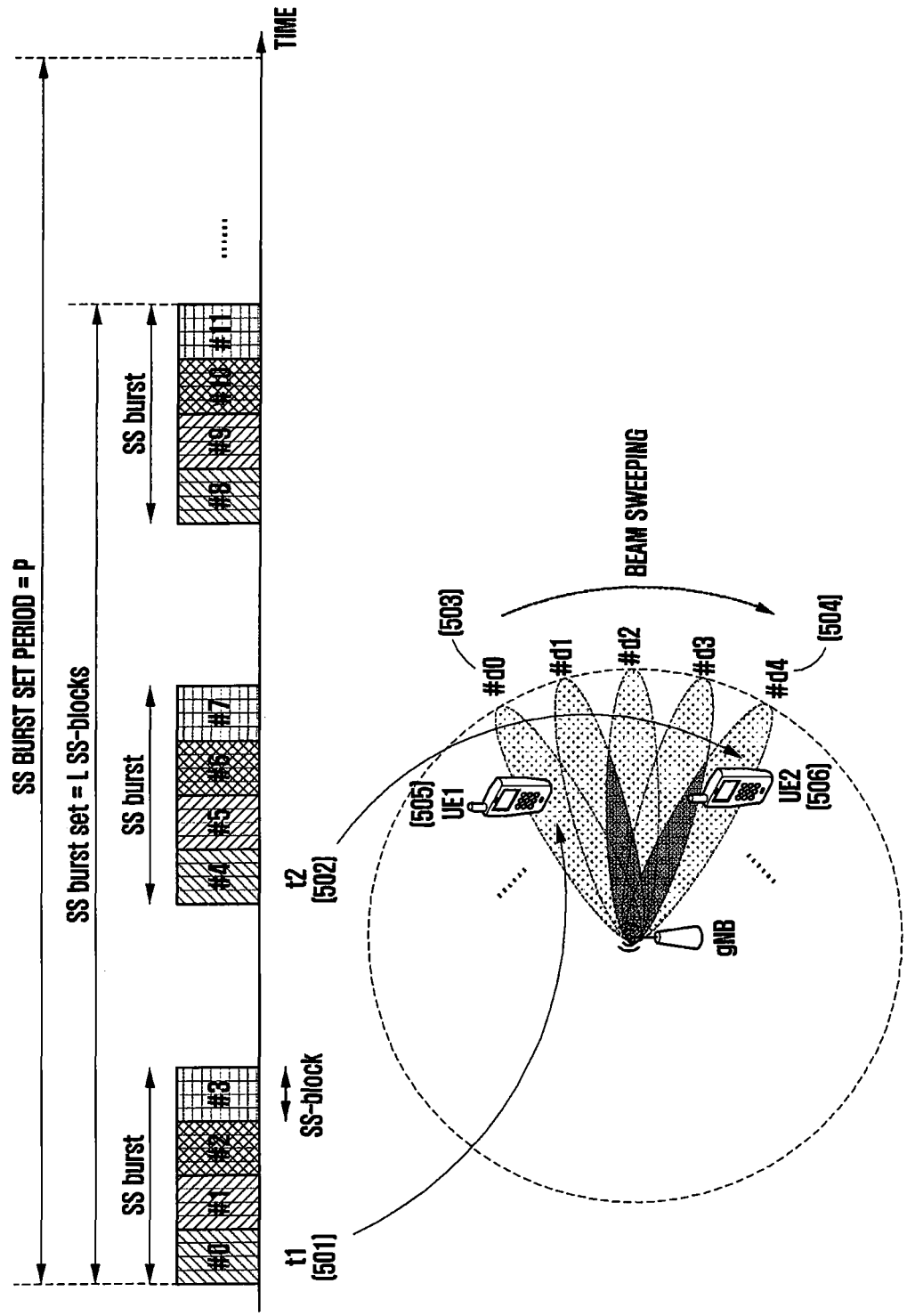
FIG. 5 is a diagram illustrating a time-domain mapping structure of a synchronization signal and a beam sweeping operation.

FIG. 5 is a diagram illustrating a time-domain mapping structure of a synchronization signal and a beam sweeping operation. The following items are defined for description.

Primary synchronization signal (PSS): This is a reference signal for DL time/frequency synchronization.

Secondary synchronization signal (SSS): This is a reference signal for DL time/frequency synchronization and provides cell ID information. In addition, this may serve as a reference signal for demodulation of a PBCH.

Physical broadcast channel (PBCH): This provides essential system information necessary for transmitting and receiving a data channel and a control channel of the terminal. The essential system information may include search space-related control information indicating radio resource mapping information of a control channel, scheduling control information about a separate data channel for transmitting system information, and the like.

Synchronization signal (SS) block: The SS block includes N OFDM symbols and is constituted by a combination of the PSS, the SSS, the PBCH, and the like. For systems where a beam sweeping technique is applied, the SS block is the minimum unit to which the beam sweeping is applied.

Synchronization signal (SS) burst: The SS burst includes one or more SS blocks. In the example of FIG. 5, each SS burst includes four SS blocks.

Synchronization signal (SS) burst set: This includes one or more SS bursts and is constituted by a total of L SS blocks. In the example of FIG. 5, the SS burst set includes 12 SS blocks in total. The SS burst set is periodically repeated for a predetermined period (P). The period (P) may be defined as a fixed value depending on the frequency band, or may be received from the base station to the terminal through signalling. If there is no signalling for the period (P), the terminal applies a predetermined default value.

FIG. 5 shows that beam sweeping is applied to each SS block with the lapse of time. In the example of FIG. 5, terminal 1 (505) receives an SS block at time t1 (501) using a beam radiated in the direction # d0 (503) by beamforming applied to SS block #0. In addition, terminal 2 (506) receives an SS block at time t2 (502) using a beam radiated in the direction # d4 (504) by beamforming applied to SS block #4. The terminal may acquire an optimal synchronization signal through the beam radiated from the base station to the position at which the terminal is located. For example, it is difficult for terminal 1 (505) to obtain time/frequency synchronization and essential system information from the SS block through the beam radiated in the direction # d4, which is far away from the position of terminal 1.

After the terminal obtains system information from the base station through the initial access procedure, the terminal performs a random access procedure in order to switch the link with the base station to a connected state. If the random access procedure is completed, the terminal switches to a connected state in which the base station and the terminal perform one-to-one communication therebetween.

Hereinafter, a random access procedure will be described in detail with reference to FIG. 6.

Figure 6:
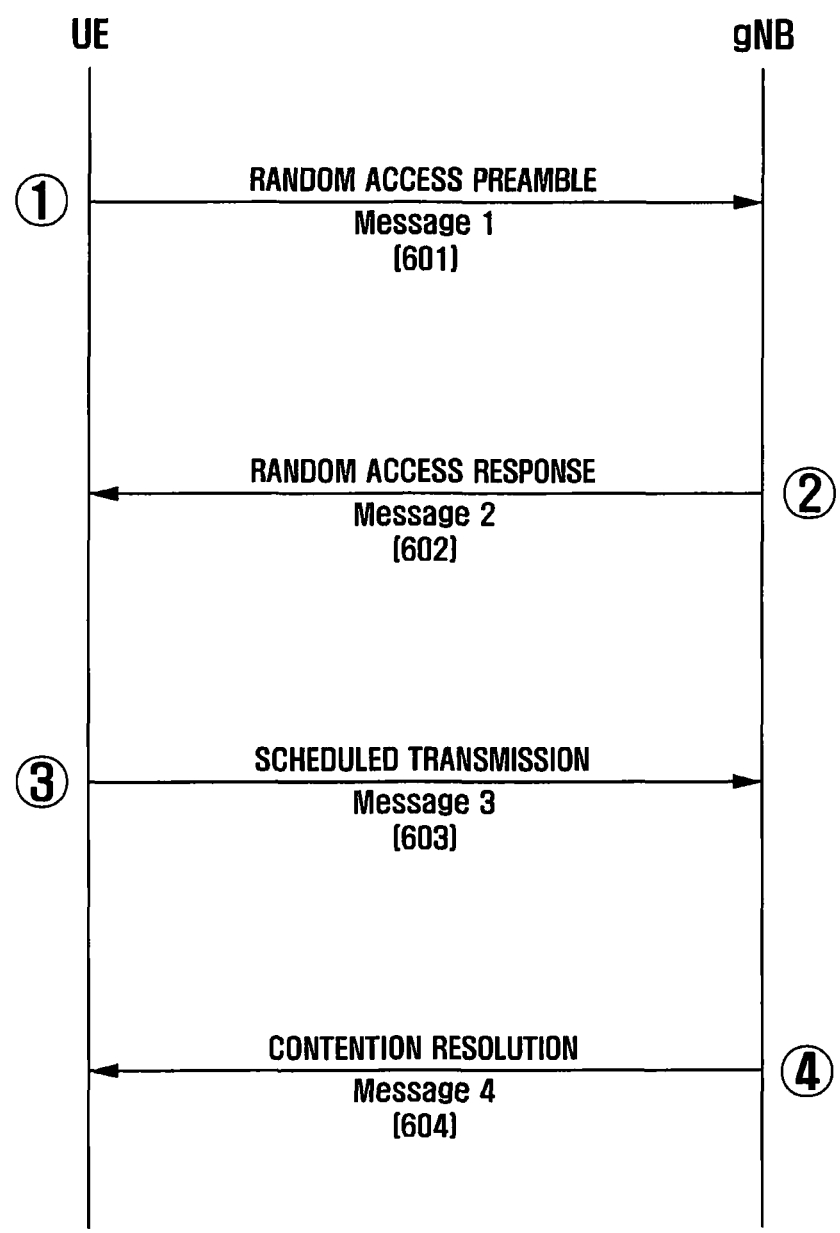
FIG. 6 is a diagram illustrating a random access procedure.

FIG. 6 is a diagram illustrating a random access procedure. Referring to FIG. 6, in the first step 601 of the random access procedure, a terminal transmits a random access preamble to a base station. Then, the base station measures a transmission delay value between the terminal and the base station, and performs uplink synchronization. At this time, the terminal arbitrarily selects a random access preamble to be used from among a set of random access preambles provided in advance by the system information. In addition, initial transmission power of the random access preamble is determined according to the pathloss between the base station and the terminal, which is measured by the terminal. Further, the terminal determines a transmission beam direction of the random access preamble from a synchronization signal received from the base station and transmits a random access preamble.

In the second step 602, the base station transmits an uplink transmission timing adjustment command to the terminal using the transmission delay value measured from the random access preamble received in the first step. The base station transmits uplink resources to be used by the terminal and a power control command as scheduling information. The scheduling information may include control information for the uplink transmission beam of the terminal.

If the terminal fails to receive a random access response (RAR) (Message 2), which is scheduling information for Message 3, from the base station for a predetermined period of time in the second step 602, the terminal repeats the first step 601. If the first step is repeated, the terminal increases the transmission power of the random access preamble by a predetermined level and then transmits the power (power ramping), thereby increasing the probability of receiving the random access preamble by the base station.

In the third step 603, the terminal transmits, to the base station, uplink data (Message 3) including its own terminal ID through an uplink data channel, such as a physical uplink shared channel (PUSCH), using the uplink resource allocated in the second step 602. The transmission timing of the uplink data channel for transmitting Message 3 follows the timing control command received from the base station in the second step 602. In addition, the transmission power of the uplink data channel for transmitting Message 3 is determined in consideration of the power control command received from the base station in the second step 602 and a power ramping value of the random access preamble. Message 3 is the first uplink data signal transmitted from the terminal to the base station after the terminal transmits the random access preamble.

Finally, in the fourth step 604, if the base station determines that the terminal has performed a random access process without contention with other terminals, the base station transmits, to the corresponding terminal, data (Message 4) including the ID of the terminal that transmitted the uplink data in the third step 603. Upon receiving the signal transmitted from the base station in the fourth step 604, the terminal determines that the random access was successful. Then, the terminal transmits HARQ-ACK/NACK indicating whether or not Message 4 was successfully received to the base station through an uplink control channel, such as a physical uplink control channel (PUCCH).

If the terminal fails to receive the data signal from the base station due to a contention between the data transmitted in the third step 603 and data of other terminals, the base station no longer transmits data to the terminal. Accordingly, if the terminal fails to receive, from the base station, the data transmitted in the fourth step 604 during a predetermined period of time, the terminal determines that the random access procedure has failed and starts the first step 601 again.

As described above, the transmission power of the uplink data channel for transmitting Message 3 is determined by the terminal in consideration of the power control command of the base station and the power ramping value of the random access preamble. In the case of a terminal supporting multi-beam transmission, it is possible to optimize the transmission power of the uplink data channel for transmitting Message 3 according to the relative relationship between the transmission beam of the random access preamble and the transmission beam of the uplink data channel for transmitting Message 3, thereby preventing unnecessary power consumption by the terminal and minimizing uplink interference. Hereinafter, the primary subject matter of the disclosure will be described with reference to detailed embodiments.

First Embodiment

The first embodiment describes a method of setting transmission power when the terminal transmits a preamble.

The random access preamble transmission power (PPRACH) of the terminal is determined by means of Equation 1 below, which is expressed in dBm.

$$P_{PRACH} = \min\{P_{CMAX,e}(i), \text{PREAMBLE\_RECEIVED\_TARGET\_POWER} + PL_e\} \text{ [dBm]} \quad \text{[Equation 1]}$$

1) $P_{CMAX,c}$: This is the maximum transmission power allowed for the terminal, and is determined by the configuration of the power class and higher signalling of the terminal. If the terminal supports a plurality of carrier frequencies, it may be determined for each carrier frequency "c".

2) $PL_c$: This is pathloss (PL) between the base station and the terminal and is an index indicating a good or bad channel environment. The higher the pathloss value, the worse the channel environment, and the smaller the change with the lapse of time. As the pathloss increases, the terminal must set a relatively large transmission power of the signal to be transmitted by the terminal, and must transmit the same in order to overcome the bad channel environment. If the terminal supports a plurality of carrier frequencies, the pathloss may be calculated for each carrier frequency "c". The pathloss is calculated from a reference signal (RS) received from the base station according to Equation 2 below.

$$PL = \text{referenceSignalPower} - \text{RSRP} \quad \text{[Equation 2]}$$

In Equation 2, "referenceSignalPower" indicates the base station transmission power of the RS provided by the base station through signalling to the terminal, and "RSRP (reference signal received power)" indicates the reception signal intensity of the RS measured by the terminal that received the RS.

3) PREAMBLE_RECEIVED_TARGET_POWER: This is random-access-preamble reception power required in order for the base station to receive the random access preamble, and is calculated according to Equation 3 below.

PREAMBLE_RECEIVED_TARGET_POWER=
preambleInitialReceivedTargetPower+DEL-
TA_PREAMBLE+(PREAMBLE_TRANSMIS-
SION_COUNTER−1)*powerRampingStep   [Equation 3]

3-1) preambleInitialReceivedTargetPower: This is the initial value of the random-access-preamble reception power required for the base station to receive the random access preamble, and is included in the system information that is then transmitted to the terminal through signalling.

3-2) DELTA_PREAMBLE: This is an offset for adjusting the additional transmission power for each random access preamble format.

3-3) PREAMBLE_TRANSMISSION_COUNTER: This is a counter indicating the number of times the random access preamble is transmitted during the random access procedure, and has an initial value of 1. If the terminal fails to receive a random access response (RAR) (Message 2) from the base station for a predetermined period of time after transmitting the random access preamble, the terminal determines that the base station has failed to receive the random access preamble and retransmits the random access preamble.

3-4) powerRampingStep: When retransmitting the random access preamble to the base station, the terminal increases the transmission power of the random access preamble as much as "powerRampingStep" (power ramping) and transmits the same to the base station with the power.

In the case of a terminal supporting multi-beam transmission, when the terminal performs power ramping of a random access preamble, and when beam switching occurs between the transmission beam of the random access preamble transmitted previously and the transmission beam of the random access preamble to be currently transmitted, the power ramping method of a random access preamble may be defined as follows. The beam switching may be determined by the terminal itself according to a predetermined criterion, or the base station may inform the terminal of whether or not the beam switching has occurred.

1) First power ramping method of random access preamble: The terminal increases the transmission power of a random access preamble as much as "powerRampingStep", regardless of beam switching. The first power ramping method of a random access preamble is suitable for an environment in which the meaningful difference in the transmission power between the transmission beams of the terminal is small. That is, the above environment has a large amount of correlation between the transmission beams of the terminal, and the power ramping is performed based on an existing transmission power value even if the beam switching occurs.

Figure 7:
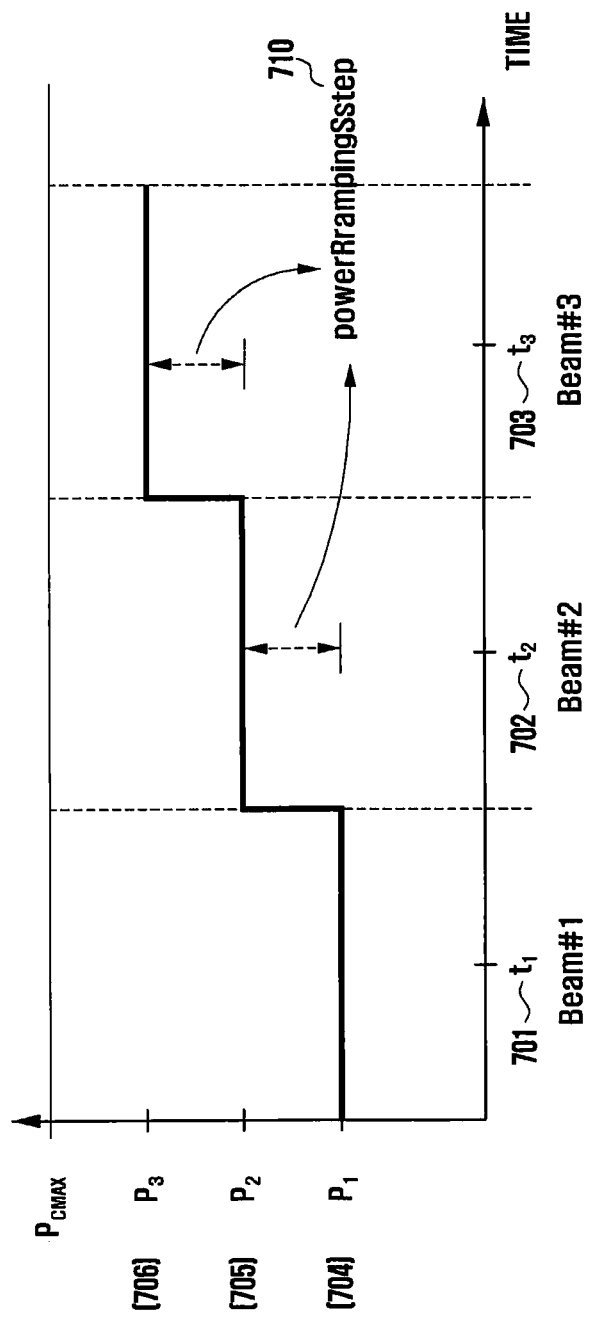
FIG. 7 is a diagram illustrating a power ramping method of a random access preamble.

FIG. 7 is a diagram illustrating a power ramping method of a random access preamble.

Referring to FIG. 7, the terminal transmits a random access preamble to the base station at time t1 (701) using beam #1 with transmission power P1 (704). If the terminal fails to receive a random access response from the base station for a predetermined period of time, the terminal increases "PREAMBLE_TRANSMISSION_COUNTER" (PREAMBLE_TRANSMISSION_COUNTER=2), and transmits the random access preamble at time t2 (702) with transmission power P2 (705), which is increased as much as "powerRampingStep" 710 from the transmission power of the random access preamble transmitted at time t1 (701). In the example of FIG. 7, the terminal transmits beam #2 of the random access preamble at time t2 (702), which is different from beam #1 of the random access preamble transmitted by the terminal at time t1 (701).

That is, even if beam switching of the random access preamble occurs, the terminal performs the power ramping operation. If the terminal again fails to receive a random access response from the base station for a predetermined period of time, the terminal increases "PREAMBLE_TRANSMISSION_COUNTER" again (PREAMBLE_TRANSMISSION_COUNTER=3) and transmits the random access preamble at time t3 (703) with transmission power P3 (706), which is increased as much as "powerRampingStep" 710 from the transmission power of the random access preamble transmitted at time t2 (702).

2) Second power ramping method of random access preamble: If beam switching occurs, the terminal initializes the power ramping operation of a random access preamble, and if no beam switching occurs, the terminal performs the power ramping operation. The second power ramping method of a random access' preamble is suitable for an environment in which the meaningful difference in the transmission power between the transmission beams of the terminal is large. That is, the above environment has a small amount of correlation between the transmission beams of the terminal, and if the beam switching occurs, the terminal ignores an existing transmission power value and initializes "PREAMBLE_TRANSMISSION_COUNTER" of Equation 3 to 1, thereby calculating the transmission power of a subsequent random access preamble.

Figure 8:
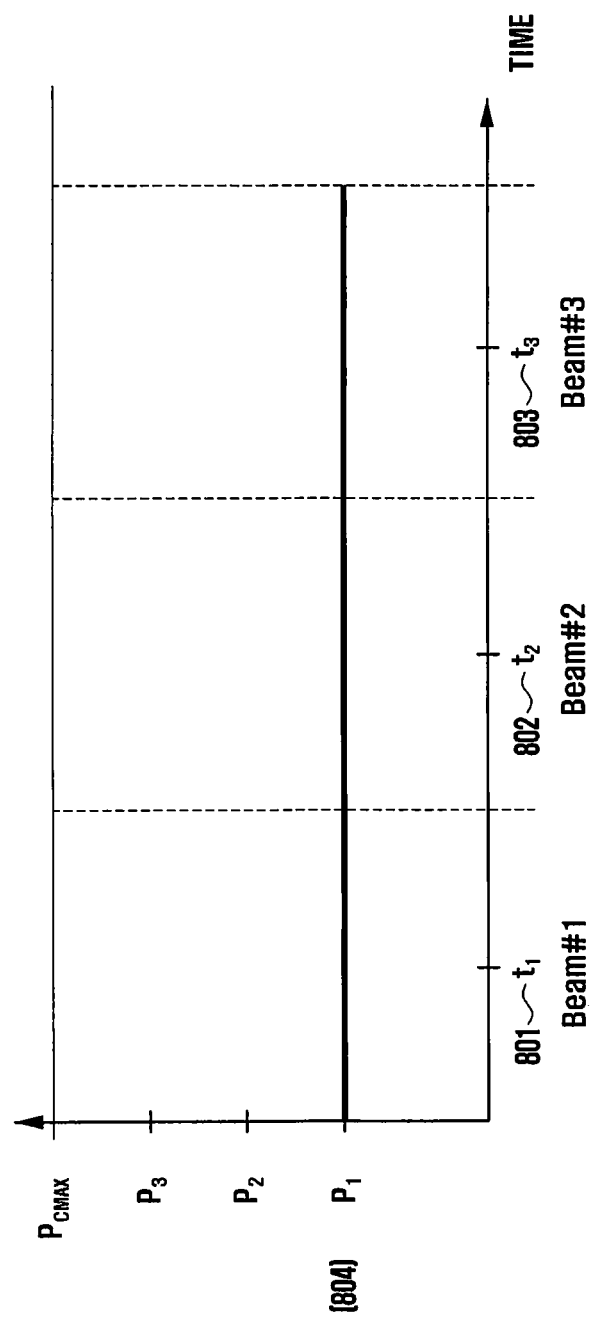
FIG. 8 is a diagram illustrating another power ramping method of a random access preamble.

FIG. 8 is a diagram illustrating another power ramping method of a random access preamble.

Referring to FIG. 8, the terminal transmits a random access preamble to the base station at time t1 (801) using beam #1 with transmission power P1 (804). If the terminal fails to receive a random access response from the base station for a predetermined period of time, the terminal transmits the random access preamble to the base station at time t2 (802) using beam #2. At this time, the terminal initializes "PREAMBLE_TRANSMISSION_COUNTER" as PREAMBLE_TRANSMISSION_COUNTER=1 according to beam switching, and thus transmits the random access preamble to the base station while maintaining the transmission power of the random access preamble to be P1 (804), which was applied at the initial time t1 (801), according to Equation 3.

If the terminal again fails to receive a random access response from the base station for a predetermined period of time, the terminal transmits the random access preamble to the base station at time t3 (803) using beam #3. Likewise, since beam switching has occurred, the terminal initializes "PREAMBLE_TRANSMISSION_COUNTER" as PREAMBLE_TRANSMISSION_COUNTER=1, and thus transmits the random access preamble to the base station while maintaining the transmission power of the random access preamble to be P1 (804), which was applied at the initial time t1 (801), according to Equation 3.

3) Third power ramping method of random access preamble: If beam switching occurs, the terminal freezes the power ramping operation of the random access preamble, and if no beam switching occurs, the terminal performs the power ramping operation. The third power ramping method of a random access preamble is suitable for an environment in which there is somewhat of a meaningful difference in the transmission power between the transmission beams of the terminal.

Figure 9:
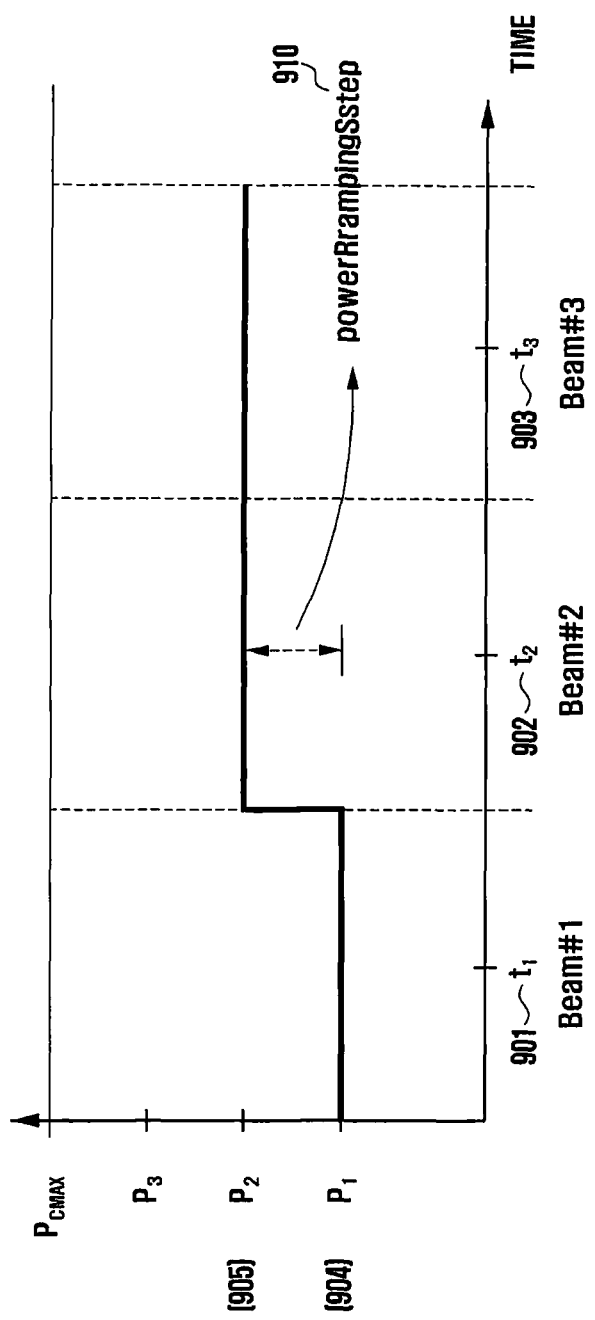
FIG. 9 is a diagram illustrating another power ramping method of a random access preamble.

FIG. 9 is a diagram illustrating another power ramping method of a random access preamble.

Referring to FIG. 9, the terminal transmits a random access preamble to the base station at time t1 (901) using beam #1 with transmission power P1 (904). If the terminal fails to receive a random access response from the base station for a predetermined period of time, the terminal retransmits the random access preamble at time t2 (902). FIG. 9 shows an example in which the beam of the random access preamble transmitted by the terminal at time t2 (902) is the same as beam #1 transmitted at time t1 (901). In this case, since no beam switching has occurred, the terminal performs the power ramping operation. Therefore, the terminal increases "PREAMBLE_TRANSMISSION_COUNTER" (PREAMBLE_TRANSMISSION_COUNTER=2) and transmits the random access preamble at time t2 (902) with transmission power P2 (905) of the random access preamble, which is increased as much as "powerRampingStep" 910 from the transmission power of the random access preamble transmitted at time t1 (901).

If the terminal again fails to receive a random access response from the base station for a predetermined period of time, the terminal transmits the random access preamble at time t3 (903). FIG. 9 shows an example in which the beam of the random access preamble transmitted by the terminal at time t3 (903) is beam #2, which is different from the beam transmitted at time t2. In this case, since beam switching has occurred, the terminal freezes "PREAMBLE_TRANSMISSION_COUNTER" to the existing value (PREAMBLE_TRANSMISSION_COUNTER=2), and thus transmits the random access preamble while maintaining the transmission power of the random access preamble to be P2 (905), which was applied at time t2.

4) Fourth power ramping method of random access preamble: The terminal performs a power ramping operation for each transmission beam thereof. That is, if beam switching occurs, the terminal initializes the power ramping operation. If the same transmission beam has been transmitted previously, the terminal performs the power ramping operation based on the corresponding transmission power. This has the same effect as that of the operation in which "PREAMBLE_TRANSMISSION_COUNTER" is defined for each transmission beam of the terminal and the power ramping operation is performed for the same transmission beam.

Figure 10:
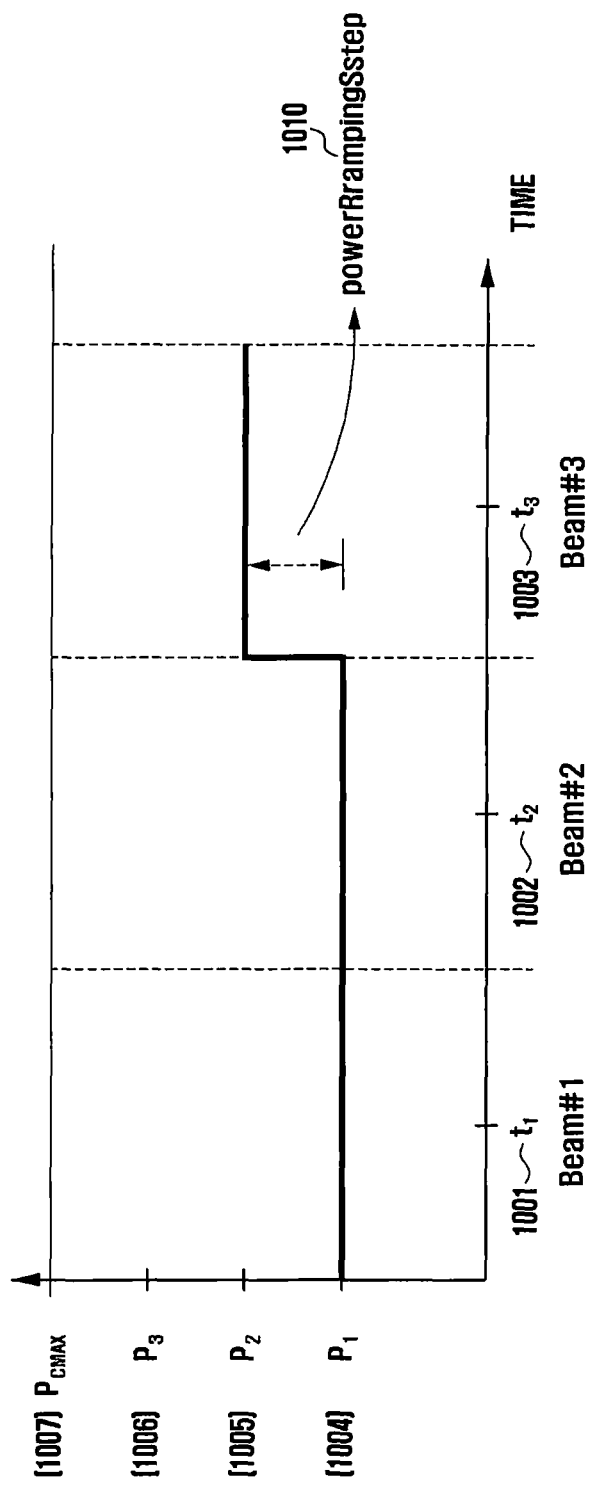
FIG. 10 is a diagram illustrating another power ramping method of a random access preamble.

FIG. 10 is a diagram illustrating another power ramping method of a random access preamble.

Referring to FIG. 10, the terminal transmits a random access preamble to the base station at time t1 (1001) using beam #1 with transmission power P1 (1004). If the terminal fails to receive a random access response from the base station for a predetermined period of time, the terminal retransmits the random access preamble at time t2 (1002).

FIG. 10 shows an example in which the beam of the random access preamble transmitted by the terminal at time t2 (1002) is beam #2, which is different from the beam transmitted at time t1 (1001), and the terminal has never transmitted the random access preamble using beam #2 prior to time t2. In this case, since beam switching has occurred, the terminal initializes the power ramping operation. Therefore, the terminal initializes "PREAMBLE_TRANSMISSION_COUNTER" as PREAMBLE_TRANSMISSION_COUNTER=1, and thus transmits the random access preamble at time t2 (1002) with transmission power P1 (1004), which was applied at time t1.

If the terminal again fails to receive a random access response from the base station for a predetermined period of time, the terminal retransmits the random access preamble at time t3 (1003). FIG. 10 shows an example in which the beam of the random access preamble transmitted by the terminal at time t3 (1003) is beam #1, which is different from the beam transmitted at time t2 but is the same as the beam transmitted at time t1. In this case, the terminal performs the power ramping operation based on the existing transmission power of beam #1. Therefore, the terminal increases "PREAMBLE_TRANSMISSION_COUNTER" (PREAMBLE_TRANSMISSION_COUNTER=2), and transmits the random access preamble at time t3 (1003) with transmission power P2 (1005), which is increased as much as "powerRampingStep" 1010 from the transmission power of the random access preamble transmitted at time t1.

According to the first to fourth power ramping methods of the random access preamble described above, the random access preamble transmission power (PPRACH) of the terminal does not exceed PCMAX according to Equation 1 above.

Second Embodiment

The second embodiment describes a method of setting and transmitting transmission power of an uplink data channel in the case where the terminal transmits Message 3 through an uplink data channel (PUSCH) in response to a random access response (Message 2) received from the base station during the random access procedure. The uplink data channel transmission power ($P_{PUSCH}$) of the terminal in slot "i" is determined according to Equation 4, which is expressed in dBm. If the terminal supports a plurality of carrier frequencies, respective parameters in the equation below may be determined for each carrier frequency "c", and may be distinguished by an index "c".

$$P_{PUSCH,c}(i) = \min\{P_{CMAX,c}(i), \text{Parameter set } A + \alpha_c(j) \cdot PL_c + f_c(i)\} \text{ [dBm]} \quad \text{[Equation 4]}$$

1) $P_{CMAX}$: This is the maximum transmission power allowed for the terminal, and is determined by the configuration of the power class and higher signalling of the terminal.

2) α(j): This is a value for partially compensating for pathloss between the base station and the terminal, where 0≤α(j)≤1.

3) PL: This is pathloss between the base station and the terminal, and the terminal calculates the pathloss from the difference between the transmission power of a reference signal (RS) received from the base station through signalling and the reception signal level of the RS by the terminal.

4) f(i): This is a power control state function calculated according to a power control command included in the base station scheduling information for slot "i". The terminal applies an initial value f(0) for transmission of Message 3, and f(0) is calculated by the method described below.

5) Parameter set A: This is a value set by the base station and transmitted to the terminal through signalling in order to compensate for uplink interference. This may include at least some of the following detailed items.

A. $M_{PUSCH}(i)$: This is the number of physical resource blocks (PRBs) and denotes the number of frequency resources scheduled by the base station for slot "i".

B. $P_{O\_PUSCH}(j)$: This is the amount of interference, which is measured by the base station and transmitted to the terminal through signalling. The index "j" depends on the type of scheduling data. That is, in the case of semi-persistent scheduling data in which scheduling information is kept unchanged for a predetermined period of time, J=1; in the case of dynamic scheduling data, j=2; and in the case where uplink data of the terminal is transmitted in the random access procedure, j=3. Therefore, $P_{O\_PUSCH}(3)$ is applied to the transmission of Message 3.

C. ΔTF(i): This is a power offset according to the format of data scheduled by the base station {transport format (TF)} or modulation and coding scheme (MCS) for slot "i".

Equation 4 above may be transformed to Equation 5 below by reflecting the detailed items of the parameter set A.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [dBm]$$

[Equation 5]

A method of determining an initial value f(0) for transmission of Message 3 of the terminal may be defined as follows according to whether or not there is beam switching between the transmission beam of a random access preamble and the transmission beam of an uplink data channel for transmitting Message 3. 1) First method of determining initial value f(0): The initial value f(0) is determined according to the transmission power of the random access preamble, which has most recently been transmitted by the terminal, and the power control command included in a random access response signal, regardless of beam switching between the transmission beam of the random access preamble and the transmission beam of Message 3. This may be expressed as Equation 6 as follows.

$$f_c(0) = \Delta P_{rampup,c} + \delta_{msg2,c}$$ [Equation 6]

$\Delta P_{rampup,c}$: This is the transmission power of the random access preamble most recently transmitted by the terminal and satisfies the following equation. $\Delta P_{rampup,c}$=(PREAMBLE_TRANSMISSION_COUNTER−1)*powerRampingStep.

$\delta_{msg2,c}$: This is a power control command included in the random access response signal.

The first method of determining the initial value f(0) is suitable for an environment in which the meaningful difference in the transmission power between the transmission beams of the terminal is small.

2) Second method of determining initial value f(0): The method of determining an initial value f(0) will be described with reference to FIG. 11.

Figure 11:
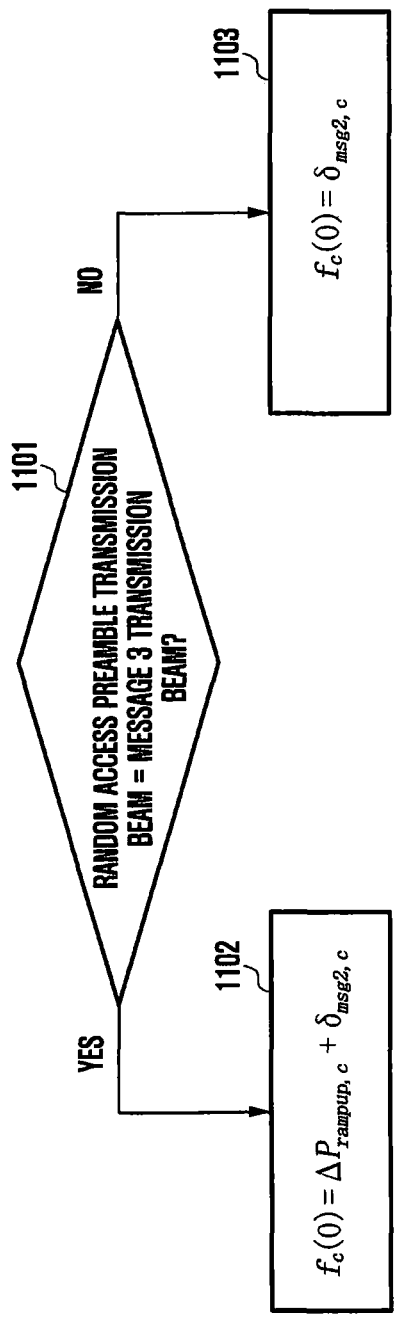
FIG. 11 is a diagram illustrating a method of determining transmission power of Message 3 by a terminal.

FIG. 11 is a diagram illustrating a method of determining transmission power of Message 3 by a terminal.

Referring to FIG. 11, if beam switching occurs between the transmission beam of a random access preamble and the transmission beam of Message 3, the terminal ignores the transmission power of the random access preamble and determines the transmission power of Message 3 according to a power control command included in the random access response signal (step 1103). This may be expressed as Equation 7 below.

$$f_c(0) = \delta_{msg2,c} \text{ (i.e., } \Delta P_{rampup,c} = 0)$$ [Equation 7]

If beam switching between the transmission beam of a random access preamble and the transmission beam of Message 3 does not occur, the terminal determines the transmission power of Message 3 according to the first method of determining the initial value f(0) (step 1102).

The second method of determining the initial value f(0) is suitable for an environment in which the meaningful difference in the transmission power between the transmission beams of the terminal is large.

3) Third method of determining f(0): The terminal determines the transmission power of Message 3 according to the transmission power of the transmission beam of the random access preamble, which is the same as the transmission beam of Message to be currently transmitted, and a power control command included in the random access response signal during the random access procedure being performed. This may be expressed as Equation 8 below.

$$f_{c,k}(0) = \Delta P_{rampup,c} + \delta_{msg2,c,k}$$ [Equation 8]

k represents the beam index of Message 3 to be transmitted at present.

$\Delta P_{rampup,c,k}$: This is the transmission power of the random access preamble to which the transmission beam k most recently transmitted by the terminal is applied, and satisfies the following equation.

$\Delta P_{rampup,c,k}$=(PREAMBLE_TRANSMISSION_COUNTERk−1)*powerRampingStep. Here, "PREAMBLE_TRANSMISSION_COUNTERk" is a counter indicating the number of times the random access preamble to which the transmission beam k is applied is transmitted during the random access procedure.

4) Fourth method of determining initial value f(0): The base station adjusts a preamble power ramping value to be applied to the transmission power of Message 3 in the fourth method of determining the initial value f(0). That is, the transmission power of Message 3 is determined according to Equation 6 above, and $\Delta P_{rampup,c}$ is determined according to Equation 9 below.

$$\Delta P_{rampup,c} = \gamma \cdot (\text{PREAMBLE\_TRANSMISSION\_COUNTER}-1)*\text{powerRampingStep}$$ [Equation 9]

γ is a weighting factor for adjusting the preamble power ramping value to be applied to the transmission power of Message 3. The base station may inform the terminal of the weighting factor through system information or through a random access response signal. For example, it is defined as γ={1, 0.9, 0.8, . . . , 0}, and the base station notifies the terminal of the value to be applied through signalling.

Figure 12:
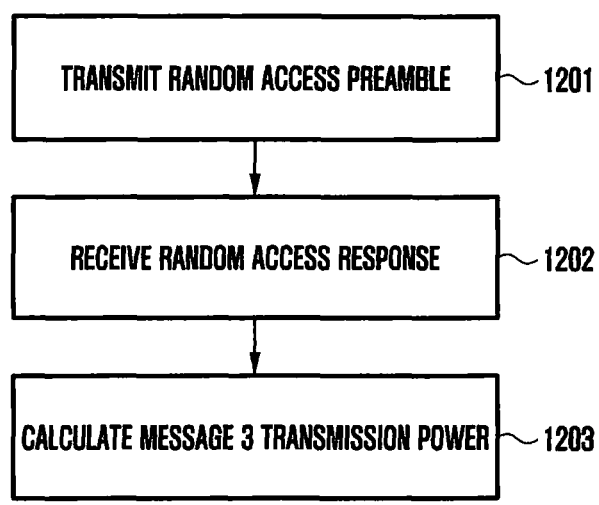
FIG. 12 is a diagram illustrating a procedure in which a terminal determines the transmission power of an uplink data channel for transmission of Message 3.

FIG. 12 is a diagram illustrating a procedure in which a terminal determines the transmission power of an uplink data channel for transmission of Message 3.

In step 1201, the terminal transmits a random access preamble. The terminal transmits the random access preamble within a predetermined number of times until a random access response signal is successfully received. The transmission power of the random access preamble is determined according to the method in the first embodiment described above.

If the terminal receives a random access response signal from the base station in step 1202, the terminal determines the transmission power of an uplink data channel for transmitting Message 3 by applying one of the first to fourth methods of determining the initial value f(0) by utilizing a power control command included in the random access response signal and the transmission power of the random access preamble in step 1203.

The random access response signal includes at least one piece of control information selected from among a power control command for Message 3, beam control information of Message 3, and a weighting factor γ for adjusting the preamble power ramp value to be applied to the transmission power of Message 3.

Table 1 shows an example of the power control command ($\delta_{msg2,c}$) included in the random access response signal. For example, if the base station intends to increase the transmission power of Message 3 of the terminal by 2 dB, the base station includes a power control command of "4" in the random access response signal and then transmits the same to the terminal.

TABLE 1

| TPC Command | Value (in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

Third Embodiment

The third embodiment describes a method of setting transmission power of an uplink control channel in the case where the terminal transmits the uplink control channel to the base station during the random access procedure. The uplink control channel (PUCCH) includes uplink control information, such as HARQ-ACK/NACK, by which the terminal sends information, as feedback, on whether or not there is an error in data received from the base station.

The transmission power ($P_{PUCCH}$) of the uplink control channel of the terminal in slot "i" is determined as Equation 10, which is expressed in dBm.

$$P_{PUCCH}(i) = \min\{P_{CMAX,c}(i), \text{Parameter set } B + PL_c + g(i)\} \quad \text{[Equation 10]}$$

1) $P_{CMAX}$: This is the maximum transmission power allowed for the terminal and is determined by the configuration of the power class and higher signalling of the terminal.

2) PL: This is pathloss between the base station and the terminal, and the terminal calculates the pathloss from the difference between the transmission power of an RS received from the base station through signalling and the reception signal level of the RS by the terminal.

3) g(i): This is a power control state function calculated according to a power control command included in the base station scheduling information for slot "i".

4) Parameter set B: This is a value set by the base station and transmitted to the terminal through signalling in order to compensate for uplink interference, and may include at least some of the following detailed items.

A. $P_{O\_PUCCH}$: This is the amount of interference, which is measured by the base station and transmitted to the terminal through signalling.

B. h($n_{CQI}$, $n_{HARQ}$, $n_{SR}$): This is an offset determined according to the amount of control information for each type of control information of a PUCCH to be transmitted by the terminal {CQI, HARQ ACK/NACJ, scheduling request (SR)}.

C. $\Delta_{F\_PUCCH}$(F): This is an offset determined according to the type of control information of a PUCCH to be transmitted by the terminal (for example, depending on whether or not it is ACK/NACK or CQI).

By reflecting the detailed items of the parameter set B, Equation 10 above may be transformed to Equation 11 below.

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{T \times D}(F') + g(i) \end{array}\right\} [dBm] \quad \text{[Equation 11]}$$

The initial value g(0) for transmission of an uplink control channel of the terminal is primarily determined according to the method of determining the initial value f(0) for transmission of Message 3 of the terminal in the second embodiment above. However, the initial value f(0) is determined in consideration of whether or not beam switching occurs between the transmission beam of a random access preamble and the transmission beam of Message 3 in the second embodiment, whereas the terminal determines the initial value g(0) in consideration of whether or not beam switching occurs between the transmission beam of a random access preamble and the transmission beam of an uplink control channel in the third embodiment.

1) First method of determining initial value g(0): The initial value g(0) is determined according to the transmission power of the random access preamble that was most recently transmitted by the terminal, and the power control command included in a random access response signal, regardless of beam switching between the transmission beam of a random access preamble and the transmission beam of an uplink control channel. This may be expressed as Equation 12 as follows.

$$g_c(0) = \Delta P_{rampup,c} + \delta_{msg2,c} \quad \text{[Equation 12]}$$

$\Delta P_{rampup,c}$: This is the transmission power of the random access preamble most recently transmitted by the terminal and satisfies the following equation. $\Delta P_{rampup,c}$=(PREAMBLE_TRANSMISSION_COUNTER−1)*powerRampingStep.

$\delta_{msg2,c}$: This is a power control command included in the random access response signal.

The first method of determining the initial value g(0) is suitable for an environment in which the meaningful difference in the transmission power between the transmission beams of the terminal is small.

2) Second method of determining initial value g(0): If beam switching occurs between the transmission beam of a random access preamble and the transmission beam of an uplink control channel, the terminal ignores the transmission power of the random access preamble and determines the transmission power of the uplink control channel according to a power control command included in the random access response signal. This may be expressed as Equation 13 below.

$$g_c(0) = \delta_{msg2,c} \text{ (i.e., } \Delta P_{rampup,c} = 0) \quad \text{[Equation 13]}$$

If no beam switching occurs between the transmission beam of a random access preamble and the transmission beam of an uplink control channel, the terminal determines the transmission power of the uplink control channel according to the first method of determining the initial value g(0).

The second method of determining the initial value g(0) is suitable for an environment in which the meaningful difference in the transmission power between the transmission beams of the terminal is large.

3) Third method of determining initial value g(0): The terminal determines the transmission power of an uplink control channel according to the transmission power of the transmission beam of the random access preamble, which is the same as the transmission beam of the uplink control channel to be currently transmitted, and a power control command included in the random access response signal during the random access procedure being performed. This may be expressed as Equation 14 below.

$$g_{c,k}(0) = \Delta P_{rampup,c} + \delta_{msg2,c,k} \quad \text{[Equation 14]}$$

k represents the beam index of the uplink control channel to be currently transmitted.

$\Delta P_{rampup,c,k}$: This is the transmission power of the random access preamble to which the transmission beam k most recently transmitted by the terminal is applied, and satisfies the following equation. $\Delta P_{rampup,c,k}$=(PREAMBLE_TRANSMISSION_COUNTERk−1)*powerRampingStep.

Here, "PREAMBLE_TRANSMISSION_COUNTER$_k$" is a counter indicating the number of times the random access preamble to which the transmission beam k is applied is transmitted during the random access procedure.

4) Fourth method of determining initial value f(0): The base station adjusts a preamble power ramping value to be applied to the transmission power of an uplink control channel in the fourth method of determination of the initial value g(0). That is, the terminal determines the transmission power of an uplink control channel according to Equation 12 above, and $\Delta P_{rampup,c}$ is determined by means of Equation 15 below.

$$\Delta P_{rampup,c} = \gamma \cdot (\text{PREAMBLE\_TRANSMISSION\_COUNTER}-1)^* \text{powerRampingStep} \quad \text{[Equation 15]}$$

γ is a weighting factor for adjusting the preamble power ramping value to be applied to the transmission power of an uplink control channel. The base station may inform the terminal of the weighting factor through system information or through a random access response signal.

For example, it is defined as γ={1, 0.9, 0.8, . . . , 0}, and the base station notifies the terminal of the value to be applied through signalling.

Figure 13:
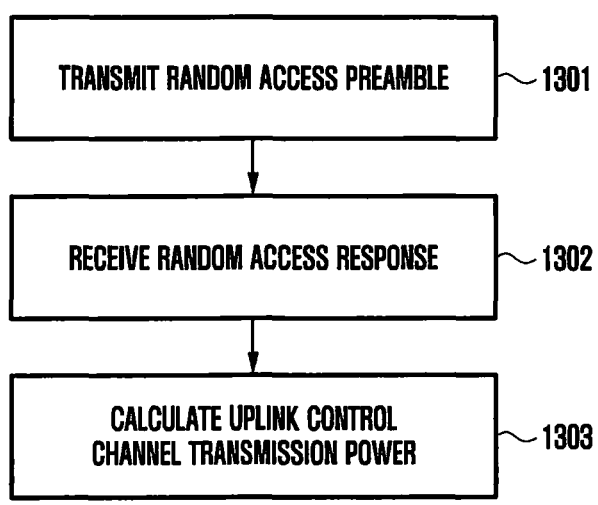
FIG. 13 is a diagram illustrating a procedure in which a terminal determines the transmission power of an uplink control channel.

FIG. 13 is a diagram illustrating a procedure in which a terminal determines the transmission power of an uplink control channel according to the third embodiment.

In step 1301, the terminal transmits a random access preamble. The terminal transmits the random access preamble within a predetermined number of times until a random access response signal is successfully received. The transmission power of the random access preamble is determined according to the method of the first embodiment described above.

If the terminal receives a random access response signal from the base station in step 1302, the terminal determines the transmission power of an uplink control channel by applying one of the first to fourth methods of determining the initial value g(0) by utilizing a power control command included in the random access response signal and the transmission power of the random access preamble in step 1303.

The random access response signal includes at least one piece of control information selected from among a power control command for an uplink control channel, beam control information of an uplink control channel, and a weighting factor γ for adjusting the preamble power ramp value to be applied to the transmission power of an uplink control channel.

Figure 14:
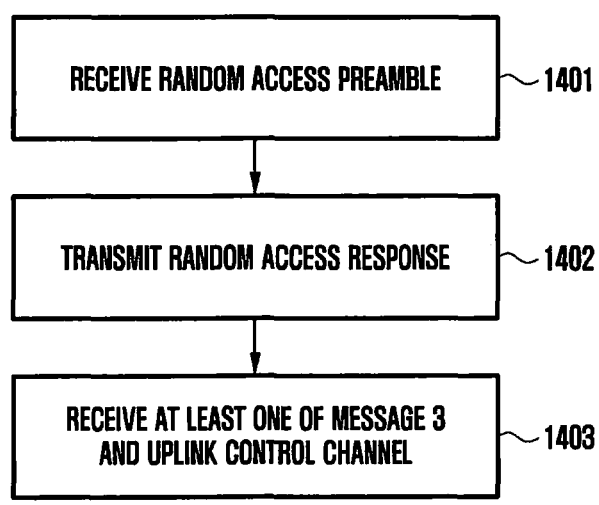
FIG. 14 is a diagram illustrating the operation of a base station according to an embodiment of the disclosure.

FIG. 14 is a diagram illustrating the operation of a base station according to an embodiment of the disclosure.

Referring to FIG. 14, in step 1401, the base station may receive a random access preamble. The terminal may transmit the random access preamble within a predetermined number of times until a random access response signal is successfully received, and the base station may receive the random access preamble. The transmission power of the random access preamble is determined according to the method of the first embodiment described above.

The base station may transmit a random access response signal in step 1402. The random access response signal may include a power control command.

Specifically, the random access response signal includes at least one piece of control information selected from among a power control command for Message 3, beam control information of Message 3, and a weighting factor γ for adjusting the preamble power ramp value to be applied to the transmission power of Message 3.

In addition, the random access response signal includes at least one piece of control information selected from among a power control command for an uplink control channel, beam control information of an uplink control channel, and a weighting factor γ for adjusting the preamble power ramp value to be applied to the transmission power of an uplink control channel. The details thereof are the same as those described above.

Accordingly, the terminal may determine the transmission power of the uplink data channel for transmitting Message 3 by utilizing the power control command and the transmission power of the random access preamble.

In addition, the terminal may determine the transmission power for transmitting the uplink control channel by utilizing the power control command and the transmission power of the random access preamble.

Detailed descriptions of determining the transmission power are the same as those described above, and will be omitted below.

Accordingly, the base station may receive at least one of Message 3 and the uplink control channel according to the determined power in step 1403.

In this case, Message 3 and the uplink control channel may be sequentially received. Alternatively, only some of Message 3 and the uplink control channel may be received.

Figure 15:
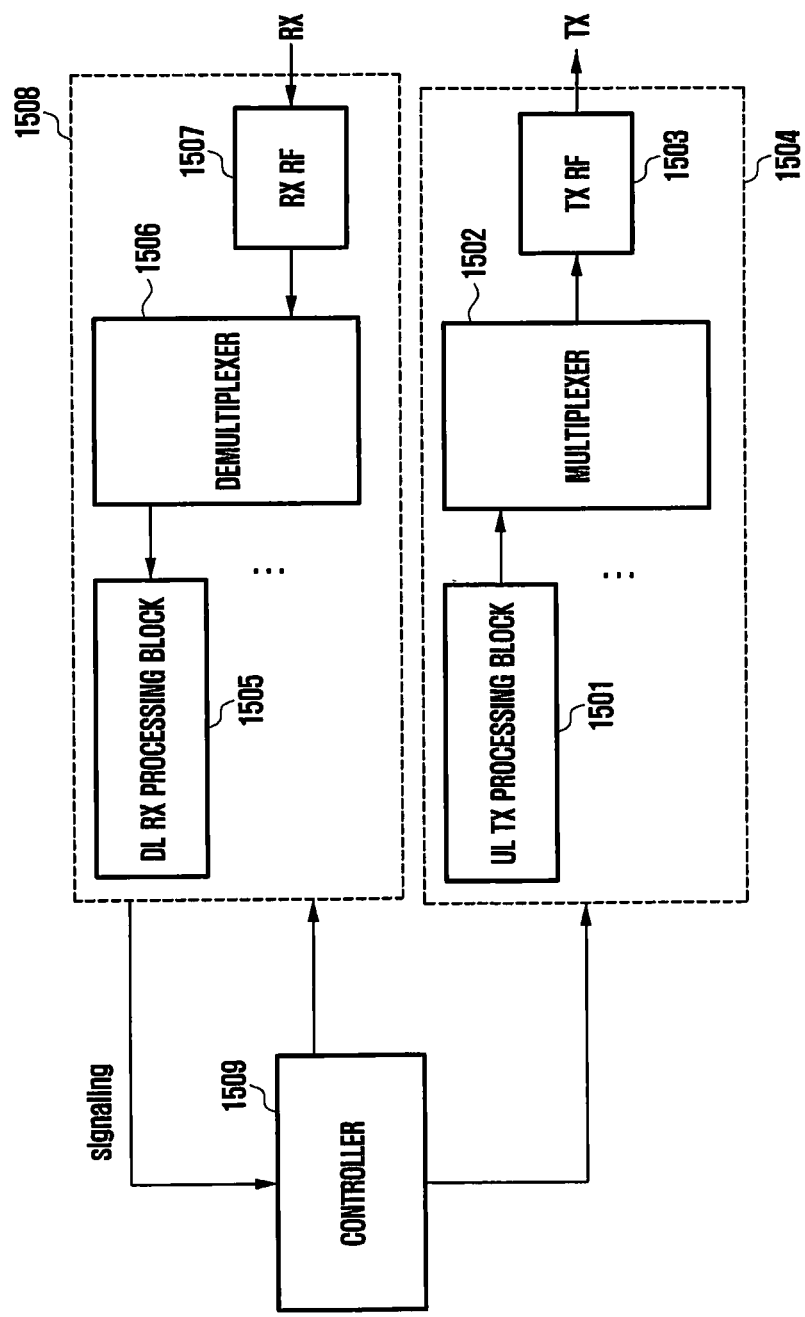
FIG. 15 is a diagram illustrating terminal transmitting/receiving device.

FIG. 15 is a diagram illustrating a terminal transmitting/receiving device. For the convenience of explanation, the illustration and description of devices not directly related to the disclosure will be omitted.

Referring to FIG. 15, a terminal includes: a transmitter 1504 including an uplink transmission processing block 1501, a multiplexer 1502, and a transmission RF block 1503; a receiver 1508 including a downlink reception processing block 1505, a demultiplexer 1506, and a reception RF block 1507; and a controller 1509. The controller 1509 controls the respective configuration blocks of the receiver 1508 such that the terminal determines whether or not to transmit a random access preamble or receive a random access response signal, thereby receiving a data channel or a control channel transmitted by the base station as described above, and the respective configuration blocks of the transmitter 1504 for transmitting uplink signals.

Specifically, the controller 1509 may control the overall operations of the terminal according to the embodiments of the disclosure. For example, the controller 1509 may control the signal flow between the respective blocks so as to perform the operations according to the flowcharts described above.

The uplink transmission processing block 1501 in the transmitter 1504 of the terminal performs processes, such as channel coding and modulation, to generate a signal to be transmitted. The signal generated in the uplink transmission processing block 1501 is multiplexed with another uplink signal by the multiplexer 1502, and is then processed by the transmission RF block 1503 to then be transmitted to the base station.

The receiver 1508 of the terminal demultiplexes the signal received from the base station and distributes the same to the respective downlink reception processing blocks. The downlink reception processing block 1505 performs processes, such as demodulation and channel decoding, on the downlink signal of the base station, thereby obtaining control information or data transmitted by the base station. The receiver 1508 of the terminal applies the output result of the downlink reception processing block to the controller 1509 so as to support the operation of the controller 1509.

Figure 16:
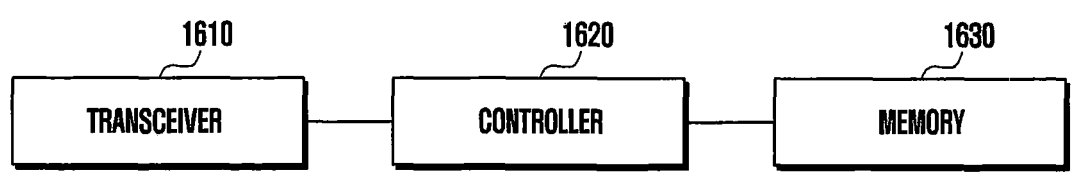
FIG. 16 is a diagram illustrating the configuration of a base station according to an embodiment of the disclosure.

FIG. 16 is a diagram illustrating the configuration of a base station according to an embodiment of the disclosure.

Referring to FIG. 16, the base station may include a transceiver 1610, a controller 1620, and a memory 1630. In the disclosure, the controller may be defined as a circuit, an application-specific integrated circuit, or at least one processor.

The transceiver 1610 may transmit and receive signals to and from other network entities. The transceiver 1610, for example, may receive a random access preamble from the terminal, and may transmit a random access response.

The controller 1620 may control the overall operations of the base station according to the embodiment of the disclosure. For example, the controller 1620 may control the signal flow between respective blocks so as to perform the operations according to the flowcharts described above. Specifically, the controller 1620 may perform control so as to determine information for the terminal to determine the power for transmitting a random access preamble, Message 3, and an uplink control channel, and so as to transmit the same to the terminal.

The memory 1630 may store at least one piece of information transmitted and received through the transceiver 1610 and information generated through the controller 1620.

Meanwhile, in the drawings illustrating the method of the disclosure, the order of description does not necessarily correspond to the order of execution, and the sequence of the execution may be varied, or the execution may be performed in parallel.

Alternatively, the drawings illustrating the method of the disclosure may include only some of the elements by excluding the remaining elements without departing from the scope of the subject matter of the disclosure.

Furthermore, the method of the disclosure may be carried out in combination of some or all of the content included in the respective embodiments without departing from the scope of the subject matter of the disclosure.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments based on the spirits of the disclosure besides the embodiments disclosed herein can be carried out. Further, if necessary, the above respective embodiments may be employed in combination.

The invention claimed is:

1. A method performed by a terminal in a wireless communication system, the method comprising:
   receiving, from a base station, system information including a power associated with a random access preamble;
   transmitting, to the base station, the random access preamble based on a first transmission power identified based on at least one of the power associated with the random access preamble, a power ramping value, and a number of times the random access preamble is transmitted;
   in case that the terminal receives a random access response message including a transmit power control (TPC) command, identifying whether beam switching occurs between a beam that transmitted the random access preamble and a beam for transmitting a request message for a radio resource control (RRC) connection;
   identifying a second transmission power for transmitting the request message based on the TPC command, the power ramping value, and the number of times the random access preamble is transmitted in case that the beam switching does not occur;
   identifying the second transmission power based on the TPC command in case that the beam switching occurs; and
   transmitting, to the base station, the request message through a physical uplink shared channel (PUSCH) based on the second transmission power.

2. The method of claim 1, wherein the first transmission power is identified based on the power associated with the random access preamble, the number of times the random access preamble is transmitted, and the power ramping value in case that the beam that transmitted the random access preamble is not changed.

3. The method of claim 1, wherein the TPC command indicates a specific value for setting the second transmission power.

4. The method of claim 1, further comprising:
   receiving, from the base station, a response message associated with the request message through a physical downlink shared channel (PDSCH), the response message including an identity of the terminal;
   identifying a third transmission power for transmitting a hybrid automatic repeat request (HARQ) acknowledgement (ACK) in response to reception of the response message, the third transmission power being identified based on the TPC command, the power ramping value, and the number of times the random access preamble is transmitted; and transmitting, to the base station, the HARQ ACK through a physical uplink control channel (PUCCH) based on the third transmission power.

5. A method performed by a base station in a wireless communication system, the method comprising:
   transmitting, to a terminal, system information including a power associated with a random access preamble;
   receiving, from the terminal, the random access preamble transmitted based on a first transmission power;
   transmitting, to the terminal, a random access response message including a transmit power control (TPC) command; and
   receiving, from the terminal, a request message for a radio resource control (RRC) connection through a physical uplink shared channel (PUSCH), the request message being transmitted based on a second transmission power,
   wherein the first transmission power is identified based on at least one of the power associated with the random access preamble, a power ramping value, and a number times the random access preamble is transmitted,
   wherein the second transmission power is identified based on the TPC command, the power ramping value, and the number of times the random access preamble is transmitted in case that beam switching does not occur between a beam that transmitted the random access preamble and a beam for transmitting the request message, and
   wherein the second transmission power is identified based on the TPC command in case that the beam switching occurs between the beam that transmitted the random access preamble and the beam for transmitting the request message.

6. The method of claim 5, wherein the first transmission power is identified based on the power associated with the random access preamble, the number of times the random access preamble is transmitted, and the power ramping value in case that the beam that transmitted the random access preamble is not changed.

7. The method of claim 5, wherein the PCT command indicates a specific value for setting the second transmission power.

8. The method of claim 5, further comprising:
   transmitting, to the terminal, a response message associated with the request message through a physical downlink shared channel (PDSCH), the response message including an identity of the terminal; and
   receiving, from the terminal, a hybrid automatic repeat request (HARQ) acknowledgement (ACK) in response to the transmission of the response message, the HARQ ACK being transmitted based on a third transmission power,
   wherein the third transmission power is identified based on the TPC command, the power ramping value, and the number of times the random access preamble is transmitted.

9. A terminal in a wireless communication system, comprising:
   a transceiver; and
   a controller coupled with the transceiver and configured to:
      control the transceiver to receive, from a base station, system information including a power associated with a random access preamble;
      control the transceiver to transmit, to the base station, the random access preamble based on a first transmission power identified based on at least one of the power associated with the random access preamble, a power ramping value, and a number of times the random access preamble is transmitted;
      in case that the terminal receives a random access response message including a transmit power control (TPC) command, identify whether beam switching occurs between a beam that transmitted the random access preamble and a beam for transmitting a request message for a radio resource control (RRC) connection;
      identify a second transmission power for transmitting the request message based on the TPC command, the power ramping value and the number of times the random access preamble is transmitted in case that the beam switching does not occur;
      identify the second transmission power based on the TPC command in case that the beam switching occurs; and
      control the transceiver to transmit, to the base station, the request message through a physical uplink shared channel (PUSCH) based on the second transmission power.

10. The terminal of claim 9, wherein the first transmission power is identified based on the power associated with the random access preamble, the number of times the random access preamble is transmitted, and the power ramping value in case that the beam that transmitted the random access preamble is not changed.

11. The terminal of claim 9, wherein the TPC command indicates a specific value for setting the second transmission power.

12. The terminal of claim 9, wherein the controller is further configured to:
   control the transceiver to receive, from the base station, a response message associated with the request message through a physical downlink shared channel (PDSCH), the response message including an identity of the terminal;
   identify a third transmission power for transmitting a hybrid automatic repeat request (HARQ) acknowledgement (ACK) in response to reception of the response message, the third transmission power being identified based on the TPC command, the power ramping value, and the number of times the random access preamble is transmitted; and
   control the transceiver to transmit, to the base station, the HARQ ACK through a physical uplink control channel (PUCCH) based on the third transmission power.

13. A base station in a wireless communication system, comprising:
   a transceiver; and
   a controller coupled with the transceiver and configured to:
      control the transceiver to transmit, to a terminal, system information including a power associated with a random access preamble;
      control the transceiver to receive, from the terminal, the random access preamble transmitted based on a first transmission power;

control the transceiver to transmit, to the terminal, a random access response message including a transmit power control (TPC) command; and control the transceiver to receive, from the terminal, a request message for a radio resource control (RRC) connection through a physical uplink shared channel (PUSCH), the request message being transmitted based on a second transmission power, wherein the first transmission power is identified based on at least one of the power associated with the random access preamble, a power ramping value, and a number of times the random access preamble is transmitted, wherein the second transmission power is identified based on the TPC command, the power ramping value, and the number of times the random access preamble is transmitted in case that beam switching does not occur between a beam that transmitted the random access preamble and a beam for transmitting the request message, and wherein the second transmission power is identified based on the TPC command in case that the beam switching occurs between the beam that transmitted the random access preamble and the beam for transmitting the request message.

14. The base station of claim 13,
wherein the first transmission power is identified based on the power associated with the random access preamble, the number of times the random access preamble is transmitted, and the power ramping value in case that the beam that transmitted the random access preamble is not changed.

15. The base station of claim 13, wherein the controller is further configured to:
control the transceiver to transmit, to the terminal, a response message associated with the request message through a physical downlink shared channel (PDSCH), the response message including an identity of the terminal, and control the transceiver to receive, from the terminal, a hybrid automatic repeat request (HARQ) acknowledgement (ACK) in response to the transmission of the response message, the HARQ ACK being transmitted based on a third transmission power, wherein the third transmission power is identified based on the TPC command, the power ramping value, and the number of times the random access preamble is transmitted.

16. The base station of claim 13, wherein the TPC command indicates a specific value for setting the second transmission power.

* * * * *